Patented July 25, 1944

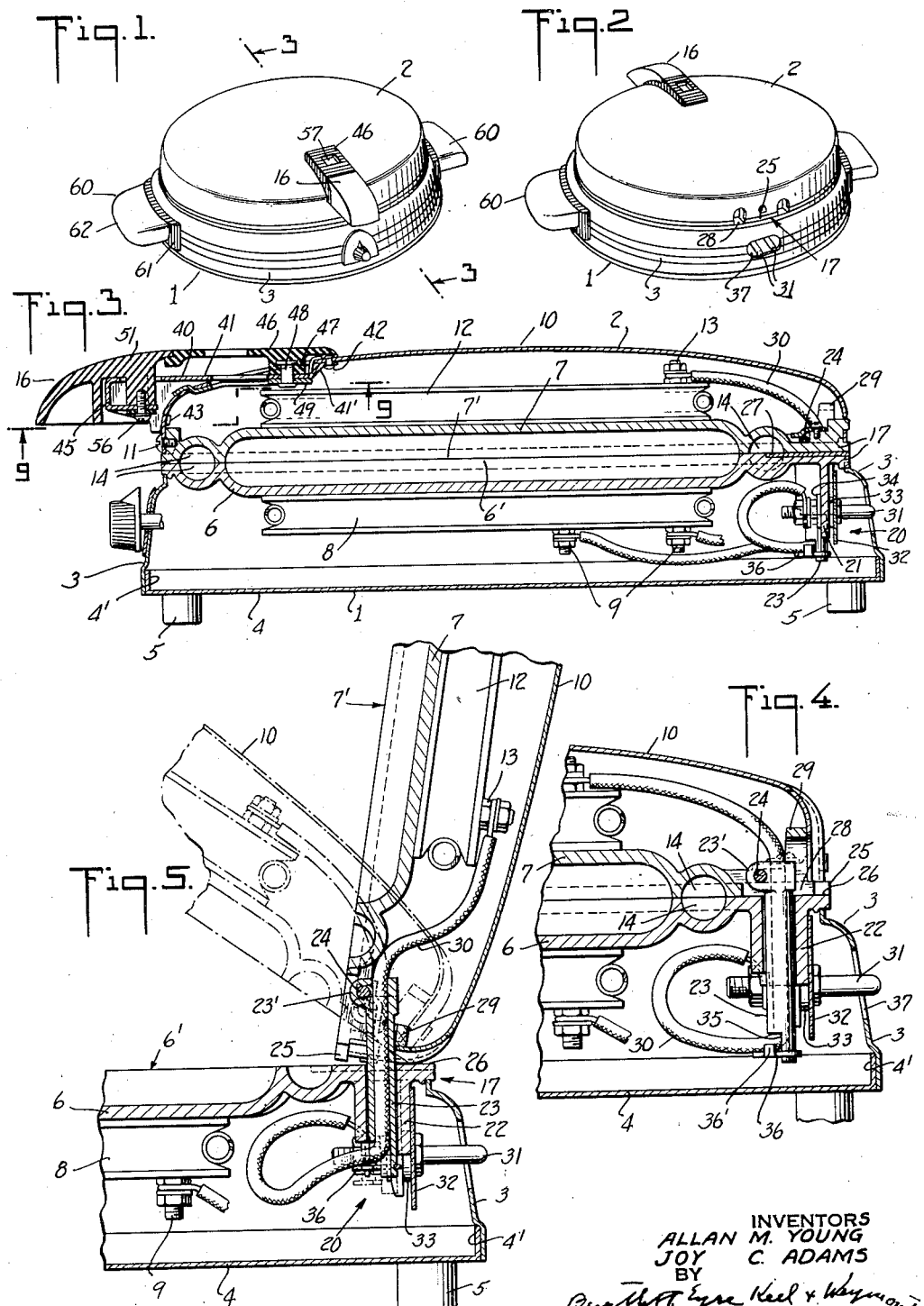

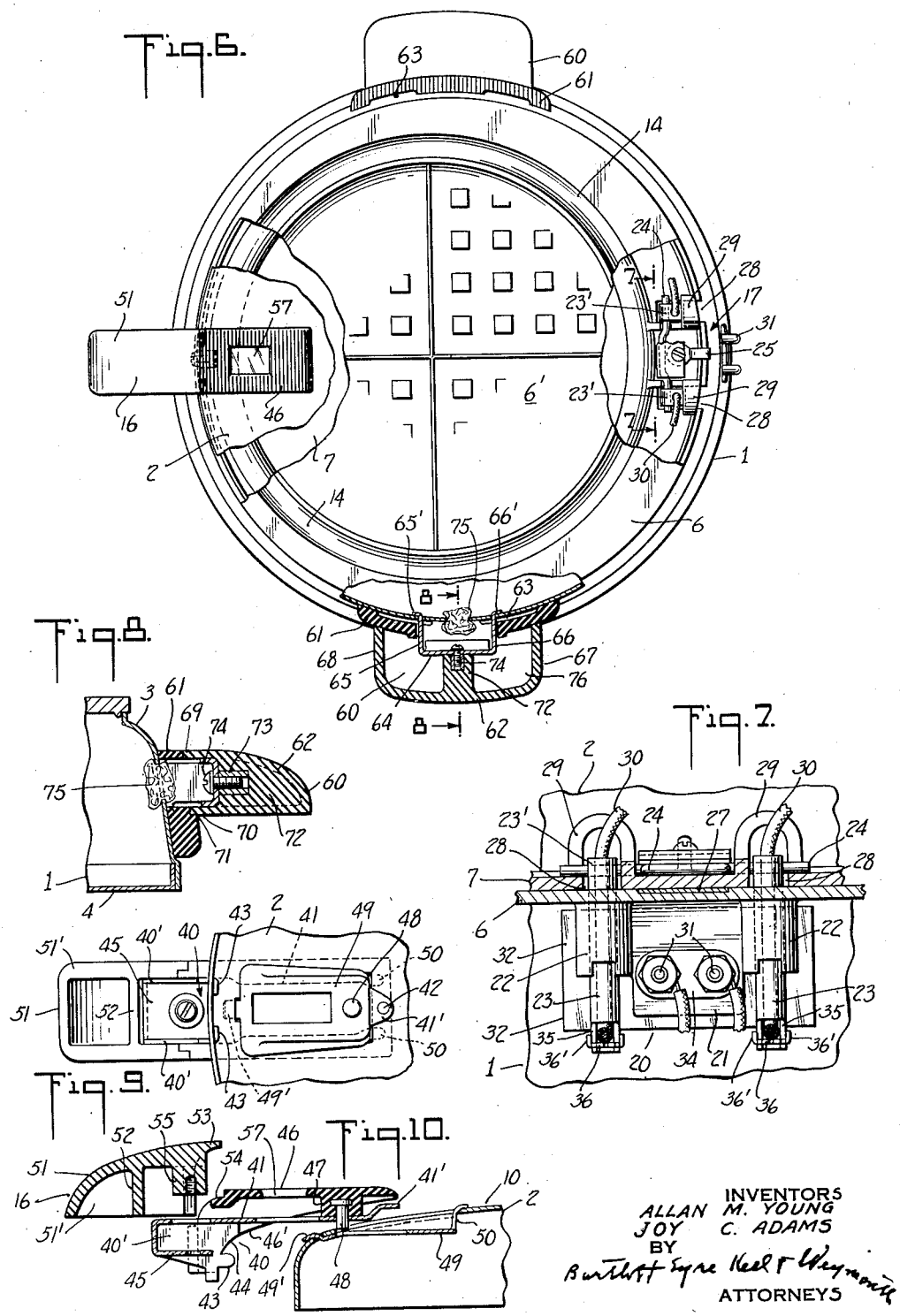

2,354,240

UNITED STATES PATENT OFFICE 2,354,240

WAFFLE IRON AND THE LIKE

Allan M. Young, Meriden, and Joy C. Adams, Fairfield, Conn., assignors, by mesne assignments, to Manning, Bowman & Co., Meriden, Conn., a corporation of Delaware Application December 26, 1940, Serial No. 371,696

17 Claims. (Cl. 99—372)

This invention relates to electric appliances and particularly to waffle irons and the like.

One object of the invention is a waffle iron structure characterized by the disposition of the fastening means between the upper and lower parts within the confines of the contour of the device.

A further object of the invention is a novel and improved waffle iron which is characterized by a novel and improved hinge structure.

A further object of the invention is a waffle iron characterized by a novel and improved batter gutter structure.

A further object of the invention is a waffle iron which is characterized by a novel and improved hinge and batter gutter structure.

A further object of the invention is a waffle iron embodying a novel and improved lead protector.

A further object of the invention is a waffle iron which is characterized by its simplicity in construction and by the novel and improved means by which the upper part of the iron is liftable about the base part of the iron.

For a better understanding of the invention reference may be had to the accompanying drawings wherein Figs. 1 and 2 are perspective views of a waffle iron;

Fig. 3 is a sectional view along the line 3—3 of Fig. 1;

Figs. 4 and 5 are sectional views of the improved hinge structure;

Fig. 6 is a plan view of the iron with certain parts broken away;

Fig. 7 is another view of the hinge structure; and

Figs. 8, 9 and 10 are views of the handle construction.

The invention is illustrated as embodied in a waffle iron comprising a base part 1 and an upper part 2. The base part 1 comprises a peripheral casing element 3 which is mounted on or fastened to a bottom plate or pan element 4, the latter having a flange 4' fitting within the lower edge of the peripheral casing member 3. Supporting feet are indicated at 5. The casing element 3 supports a lower grid 6 and the latter is heated by an electrical heating element 8 having terminals 9 for conducting electrical energy thereto. The upper part or lid of the iron comprises a casing 10 and to the downwardly turned peripheral edge of this cover 10 is fastened the upper grid 7, as for example, being fastened thereto by screw elements 11 engaging lugs formed on the upper grid 7. The upper grid 7 carries an electrical heating element 12 and the latter is provided with electrical terminals 13 for supplying electrical energy. The grid castings 6 and 7 have their grids 6' and 7' formed eccentrically of the castings, and these grids are surrounded by a batter gutter 14 which is also disposed eccentrically in the castings. The eccentricity of the grids and the batter gutter is toward the front of the waffle iron, namely, toward the lift handle 16, and accordingly at the points adjacent the lid lifting handle 16 the gutter 14 is closely disposed to the peripheral edge of the grid castings. At the rear, however, the gutter 14 is spaced a substantial distance from the peripheral edge of the grid castings as indicated at 17, and the fastening mechanism between the base 1 and the lid 2 is disposed within this space between the gutter and the rear part of the iron. A special fastening means between the lid and the base is provided which is of a character to be mounted within this base and to accommodate the conductor leads leading to the heating element of the upper grid.

This special fastening means between the lid and the base, though not a conventional hinge, nevertheless permits the lifting and pivoting of the lid 2 about the base 1 for the introduction of batter and the removal of the waffle therein. It comprises a bracket indicated generally by the numeral 20 which is formed integrally with the lower grid casting 6 and this bracket consists of a plate 21 having on the opposite edges thereof a pair of tubular guide bearings 22. A pair of tubular members or pins 23 are adapted to slide up and down in these tubular guides 22 during the opening and closing movements of the lid. These hollow pins 23 have journals 23' formed on their upper ends to one side thereof, namely the inner side, and a pin or shaft 24 is mounted in the casting of the upper grid 7 for these journals 23'. The hollow pins 23 are longer than the tubular guide members 22 and project down to a point substantially below the lower ends of the tubular guide members 22 when the lid is in the closed position. When the lid is in the closed position the shaft or pin 24, upon which the pins 23 are journaled at their upper ends, is disposed slightly above the lower grid, and in the open position of the lid as shown in Fig. 5 the upper ends of the tubular pins 23 are elevated to a point substantially above the closed position point or level. During the opening operation the heel 25 of the grid casting 7 slides along the surface 26 of the heel of the lower grid casting 6 and at this point a wear plate 27 is mortised into the rear of the casting 6. The casting of the grid 7 is formed with recesses 28 in the rear thereof to accommodate the tubular pins 23 when the lid is lifted to its open position as indicated in Fig. 5, and at these recesses the casting is formed with a pair of arches 29 with which the tubular pins 23 engage to lock the lid in the lifted position shown in Fig. 5 against further movement to the right. These expanding pin-like hollow members 23 accommodate the lead conductors 30 which lead up to the terminals 13 of the heater element 12 of the upper grid. The bracket plate 21 forms a terminal board for the plug terminals 31, the latter being insulated from the plate by a double layer 32, 33 of insulation, as mica, and an inner insulating sheet 34. The lower ends of the tubular guide members 23 are cut away on their inner sides as indicated at 35 and clips 36 of U-shape having upturned legs 36' fastened thereto by pinching the legs into the groove shown in the pins. These clips function to engage the conductors 30 and prevent sliding of the conductors 30 within the tubular member 23 during the opening and closing operations of the lid. These clips also function to prevent withdrawal of the pins 23 from the guides when the lid is opened. The outer casing 3 is provided with an opening 37 to accommodate the plug terminals 31 and to permit the insertion of an electrical plug connection. The whole expanding hinge mechanism between the upper and lower parts are thus wholly confined within the contour of the casing members 3 and 10, thereby being neatly concealed, while the conductors are taken care of by the special hinge structure shown.

The handle construction 16 and its mount comprises a sheet metal bracket 40 having an arm 41 which is fastened to the cover 10 by means of a rivet 42 fastened through the cover and through the offset end 41' of the arm and is also fastened to the cover 10 by a pair of bendable ears 43 formed from side wing members 40' of the bracket, the ears 43 extending through openings in the cover 10 and being bent over in a conventional manner. The wings 40' of the bracket are provided with curved edges 44 which conform to the contour of the cover 10. The bracket also comprises a rearwardly extending plate 45. The handle 16 comprises also an insulating part 46 which is provided with a boss 47 having molded thereto a rivet 48. This rivet 48 is riveted to the arm 41 and to another sheet metal member 49, the latter having upturned ears 50 extending upwardly through openings in the cover 10 and peened over against the upper surface of the cover 10 as indicated. The member 49 also extends outwardly of the cover 10 and is provided with a tongue 49' which passes through an opening formed in the cover 10 and the end of the member 49 is peened over against the outer surface of the cover. The member 46 is provided with wings 46' on either side thereof having a curved edge conforming generally to the contour of the cover 10. This insulating part 46 of the handle is of high heat insulating material, as for example of heat resistant molded material capable of withstanding and shielding against the transfer of heat from the hot bottom shell of the iron. The outer part 51 of the handle 16 may also be of heat insulating material but it need not be of as high insulating quality as the handle part 46. The part 51 is molded into the shape shown comprising a top of gradually curved surface and two side wings 51' joined by a strengthening web 52. The inner edge 53 of the outer part 51 rests upon a seat 54 formed in the fore-part of the panel part 46, the two engaging surfaces being curved to correspond to each other. The part 51 is provided also with a boss 55 which is screw-threaded for receiving a screw bolt 56 which passes up through the part 45 of the bracket 40 and secures the handle part 51 to the bracket, an insulating washer being disposed between the bolt 56 and the metallic part 45. The handle part 46 is provided with a window 57 for rendering visible indicating devices included either in the handle part 46 or inside the lid, and the members 49 and 41 are provided with registering openings for giving the desired vision.

The side handles 60 of the iron are also of two-part construction, having a part 61 adjacent to and engaging with the casing of the lower half of the iron which is of a material similar to the material of which the part 46 of the lifting handle is made, namely, having high heat insulating resistance as well as ability to withstand the high heats involved. The outer part 62 may also be of insulating material, but need not be as highly resistant as that of part 61. The part 61 lies flat against the casing part 3 except that at 63 is indicated an air gap. It is provided with a central opening for the reception of an attaching bracket 64, this bracket being of any suitable sheet metal and being of U-shape having legs 65 and 66 which pass through an opening formed in the part 61 and which have tongues 65' and 65' passing through openings in the side casing and peened over as indicated to hold the bracket member 64 firmly in position. The outer part 62 is formed with two side wings 67 and 68 which engage the part 61 and similarly the part 62 is formed with top and bottom 69 and 70 which also engage the part 61, the top 69 being flush with the top of the part 61 and the bottom 70 being mortised into the part 61 as indicated at 71. The outer part 62 of the handle is also provided with a central boss 72 which has molded therein a screw-threaded sleeve 73 for the reception of a fastening bolt 74 which is screwed from the inner side through the bracket 64 into the sleeve. An opening is provided in the casing 3 for providing access to the screw 74 and a closing medium 75 is indicated for this opening. The outer part 62 of the handle has a limited contact area with the part 61, as indicated, and is provided with air chambers 76 so as to minimize the heat conduction. Both the outer part 62 and the inner part 61 of the handle are removable by removing the screw 74.

We claim:

1. In an electric cooking appliance a lower part having a grid element therein, a lid part having a grid element therein mating the grid element of the lower part, said lid part being wholly supported upon the upper surface of said grid element, said lid being liftable about the lower part to assume angular positions with respect thereto while still supported thereon, and a fastening means between the parts permitting the lifting of the lid part comprising a guide channel in one of said parts, and a pin movable in said guide channel and pivotally connected with the other part, with the edge of the lid part in the vicinity of the fastening means sliding along the corresponding surface of the other part as a bearing support when the lid is lifted to assume angular positions with respect to the other part.

2. In an electric cooking appliance a lower part having a grid element therein, a lid part having a grid element therein mating the grid element of the lower part, said lid part being wholly supported upon the upper surface of said grid element, said lid being liftable about the lower part to assume angular positions with respect thereto while still supported thereon, and a fastening means between the parts permitting the lifting of the lid part comprising a guide channel in one of said parts, and a pin movable in said guide channel and pivotally connected with the other part, with the edge of the lid part in the vicinity of the fastening means sliding along the corresponding surface of the other part when the lid is lifted to assume angular positions with respect to the other part, said parts containing a casing which entirely encompasses said fastening means.

3. In a waffle iron and the like, upper and lower grid elements having grids and a surrounding batter gutter disposed nearer one side than the other side of said elements and a fastening means permitting lifting of the upper grid from the lower grid and disposed between the batter gutter and the periphery of the grids at the side where the gutter is farther removed therefrom, said fastening means comprising a tubular guide member carried by the lower grid, guide pins pivotally attached to the upper grid and sliding in said tubular guides.

4. In a waffle iron and the like, upper and lower grid elements having grids and a surrounding batter gutter disposed nearer one side than the other side of said elements and a fastening means permitting lifting of the upper grid from the lower grid and disposed between the batter gutter and the periphery of the grids at the side where the gutter is farther removed therefrom, said fastening means comprising a tubular guide member carried by the lower grid, guide pins pivotally attached to the upper grid and sliding in said tubular guides, and the heel of the upper grid element sliding along the surface of the lower grid element as the lid is lowered and lifted and the anchoring pins slide along said guides.

5. In a waffle iron and the like, upper and lower grid elements having grids and a surrounding batter gutter disposed near one side than the other side of said elements and a fastening means permitting lifting of the upper grid from the lower grid and disposed between the batter gutter and the periphery of the grids at the side where the gutter is farther removed therefrom, said fastening means comprising a tubular guide member carried by the lower grid, guide pins pivotally attached to the upper grid and sliding in said tubular guides, and the heel of the upper grid element sliding along the surface of the lower grid element as the lid is lowered and lifted and the anchoring pins slide along said guides and casing elements surrounding said grid elements and concealing said fastening means.

6. In a waffle iron and the like, circular upper and lower grid elements, said elements having mating grids and mating batter gutters surrounding the grids which are eccentrically formed in the grid elements so as to provide a comparatively wide space between the gutter and the contour of the grid elements on one side, fastening means between said grid elements disposed between planes tangent to the periphery and the batter gutter at said mentioned space and a casing for said grid elements concealing said fastening means.

7. In a waffle iron and the like, circular upper and lower grid elements, said elements having mating grids and mating batter gutters surrounding the grids which are eccentrically formed in the grid elements so as to provide a comparatively wide space between the gutter and the contour of the grid elements on one side, fastening means between said grid elements disposed between planes tangent to the periphery and the batter gutter at said mentioned space and a casing for said grid elements concealing said fastening means, said fastening means comprising a tubular guide formed in the lower grid element and a pin sliding therein and pivotally attached at its upper end to the upper grid element, said upper grid element having a recess accommodating the pin upon pivotal movement between the pin and the upper grid and having a stop engaging the pin and limiting the pivotal movement to hold the upper grid element in a substantially vertical position.

8. In a waffle iron and the like, circular upper and lower grid elements, said elements having mating grids and mating batter gutters surrounding the grids which are eccentrically formed in the grid elements so as to provide a comparatively wide space between the gutter and the contour of the grid elements on one side, fastening means between said grid elements disposed between planes tangent to the periphery and the batter gutter at said mentioned space and a casing for said grid elements concealing said fastening means, said fastening means comprising a tubular guide formed in the lower grid element and a pin sliding therein and pivotally attached at its upper end to the upper grid element, said upper grid element having a recess accommodating the pin upon pivotal movement between the pin and the upper grid and having a stop engaging the pin and limiting the pivotal movement to hold the upper grid element in a substantially vertical position, said guiding pin being hollow for the accommodation of an electric conductor lead leading up to a heater for the upper grid.

9. In a waffle iron and the like, circular upper and lower grid elements, said elements having mating grids and mating batter gutters surrounding the grids which are eccentrically formed in the grid elements so as to provide a comparatively wide space between the gutter and the contour of the grid elements on one side, fastening means between said grid elements disposed between planes tangent to the periphery and the batter gutter at said mentioned space and a casing for said grid elements concealing said fastening means, said fastening means comprising a tubular guide formed in the lower grid element and a pin sliding therein and pivotally attached at its upper end to the upper grid element, said upper grid element having a recess accommodating the pin upon pivotal movement between the pin and the upper grid and having a stop engaging the pin and limiting the pivotal movement to hold the upper grid element in a substantially vertical position, the tubular guide carrying a plate forming a switch block for an electric plug connection.

10. A waffle iron having grid elements, eccentrically disposed grids and mating batter gutter parts which are eccentrically disposed with respect to grid elements and fastening means between the upper and lower grid parts permitting lifting movements of the upper grid, said fastening means being disposed between planes tangent to the eccentrically disposed batter gutter and the periphery of the grid elements, with a housing disposed around the iron and concealing fastening means.

11. In a waffle iron and the like, circular upper and lower grid elements, said elements having mating grids and mating batter gutters surrounding the grids which are eccentrically formed in the grid elements so as to provide a comparatively wide space between the gutter and the contour of the grid elements on one side, fastening means between said grid elements disposed betwen planes tangent to th periphery and the batter gutter at said mentioned space and a casing for said grid elements concealing said fastening means, said fastening means comprising a tubular guide formed in the lower grid element and a pin sliding therein and pivotally attached at its upper end to the upper grid element, said upper grid element having a recess accommodating the pin upon pivotal movement between the pin and the upper grid and having a stop engaging the pin and limiting the pivotal movement to hold the upper grid element in a substantially vertical position, the guide pins being hollow for the accommodation of electric conductors and being provided with clips engaging the conductors to prevent sliding of the conductors in the pins during the lifting and lowering of the upper part of the waffle iron.

12. A waffle iron comprising a pair of grid elements having mating batter gutters eccentrically disposed with respect to said elements and a housing concentric with respect to said elements and the latter being mounted within said housing.

13. A waffle iron comprising a pair of grid elements having mating grids and batter gutters, said grids and gutters being concentric with respect to each other and eccentric with respect to the grid elements and a housing concentric with respect to said elements and the latter being mounted within said housing.

14. In an electric cooking appliance, a lower part and a lid part, said lid part being liftable about the lower part to assume an angular position with respect thereto, and a fastening means between the parts permitting the lifting of the lid part comprising a guide channel in one of said parts, and a pin movable in said guide channel and pivotally connected with the other part, said pin being hollow for the accommodation of an electric conductor leading to a heater for the lid part, the edge of the lid part in proximity to the fastening means sliding along the corresponding surface of the other part as a bearing support when the lid is lifted to assume an angular position, and an electric conductor passing through said hollow pin.

15. In an electric cooking appliance, a lower part and a lid part, said lid part being liftable about the lower part to assume an angular position with respect thereto, and a fastening means between the parts permitting the lifting of the lid part comprising a guide channel in one of said parts, and a pin movable in said guide channel and pivotally connected with the other part, said pin being hollow for the accommodation of an electric conductor leading to a heater for the lid part, the edge of the lid part in proximity to the fastening means sliding along the corresponding surface of the other part as a bearing support when the lid is lifted to assume an angular position, and an electric conductor passing through said hollow pin, and said pin being provided with a clip engaging the conductor to prevent sliding of the same in the hollow pin during the lifting and lowering of the lid.

16. In an electric cooking appliance, a lower part and a lid part supported thereon, said lid being liftable about the lower part to assume angular positions with respect thereto while still supported thereon and a fastening means between the parts permitting the lifting of the lid part comprising a guide channel in one of the said parts, and a pin movable in said guide channel and pivotally connected with the other part, said lid part being provided with a supporting edge in proximity to the fastening means resting upon and sliding along the corresponding surface of the other part when the lid is lifted and said other part being provided with a wear-plate which entirely supports the lid during the lifting movement and over which said edge slides during the lifting and lowering movement.

17. In a cooking appliance, a lower part and a lid part supported thereon, said lid being liftable about the lower part to assume an angular position with respect thereto while still supported thereon, a fastening means between the parts permitting the lifting of the lid part comprising a guide channel in one of said parts and a pin movable in said guide channel and pivotally connected with the other part, said lid part being provided with a supporting edge in the vicinity of the fastening means and sliding along the corresponding surface of the upper part when the lid is lifted to assume the angular position, and means carried by one of said parts for engaging the pin when the lid is lifted to limit the angular movement of the lid.

ALLAN M. YOUNG.
JOY C. ADAMS.